Patented Nov. 2, 1943

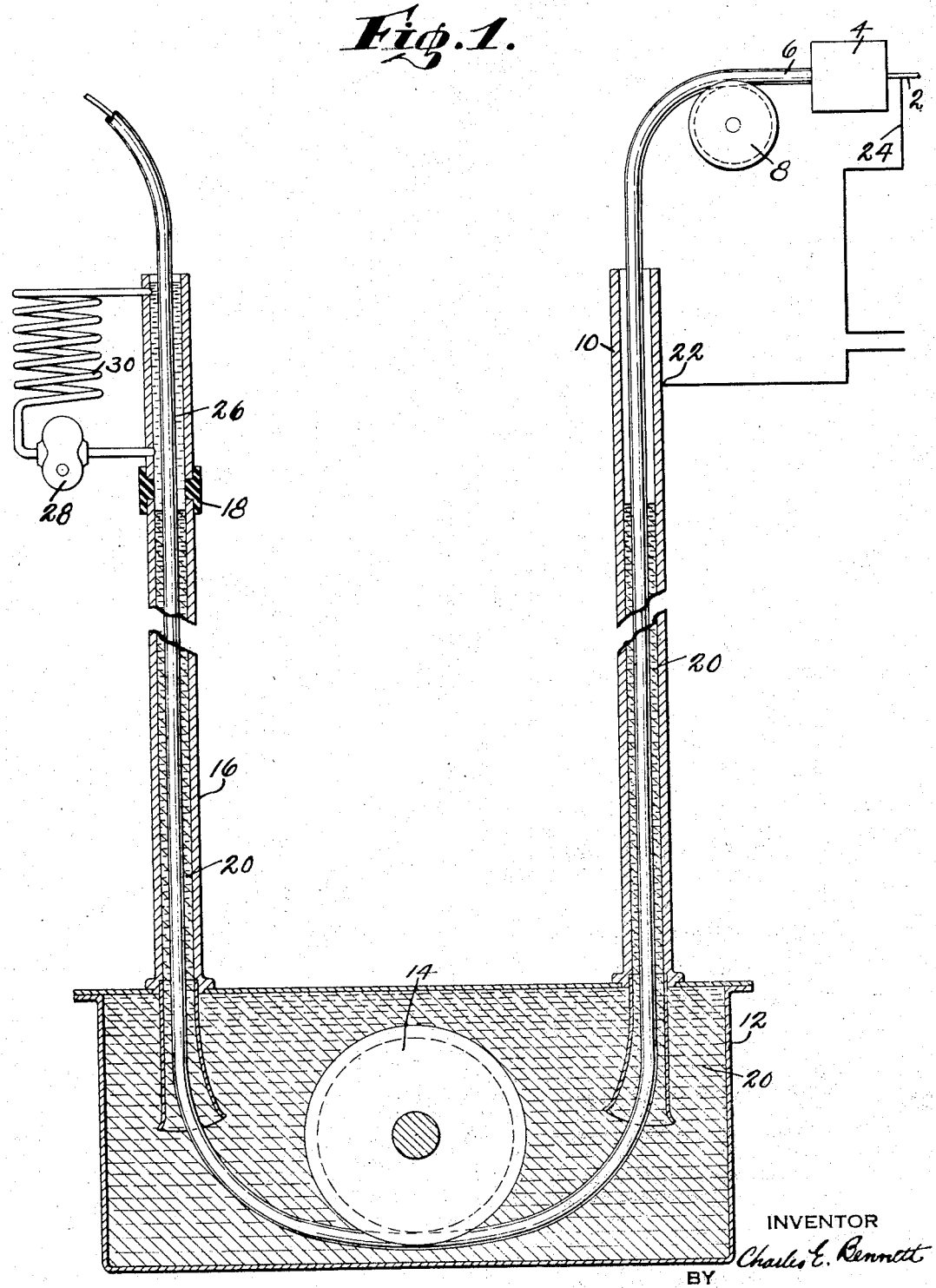

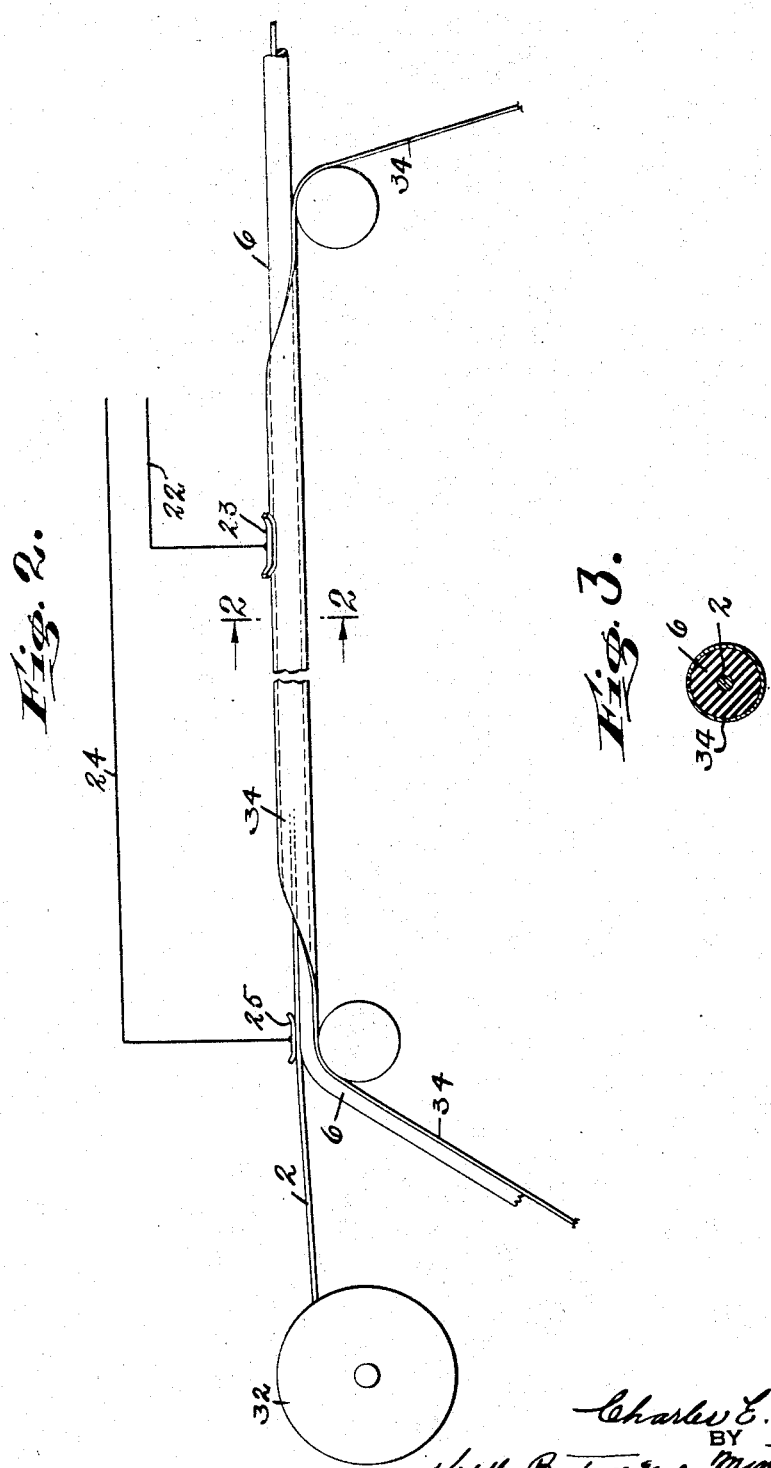

2,333,143

UNITED STATES PATENT OFFICE 2,333,143

PROCESS OF AND APPARATUS FOR THE HEAT CURING OF MATERIALS

Charles E. Bennett, Ridgewood, N. J., assignor to The Okonite Company, Passaic, N. J., a corporation of New Jersey Application May 31, 1940, Serial No. 337,975

5 Claims. (Cl. 18—6)

This application is directed to the heat curing of materials such as vulcanizable materials, plastics and other heat curable materials.

More specifically my invention provides for the cure to be effected electrically and with the material being treated either confined or under pressure.

Still more specifically my invention is directed to performing the curing operation while moving the material through a mass the weight of which imposes pressure on the material being cured, or while the material is enclosed in a metal sheath connected to one side of a high frequency circuit. When pressure applying material is employed the same may be a liquid, a comminuted mass or a mixture of the two. For the sake of brevity the pressure imposed will be referred to as static pressure to distinguish from an applied pressure such as steam pressure, for example.

A further object of my invention is the provision of a process such as above briefly outlined in which the curing operation is continuous and takes place while the material is advancing. By reason of the fact that when pressure is employed the same is a static pressure the necessity of stuffing boxes and the like is eliminated.

A further object of my invention is the provision of a process for the heat curing of materials wherein the material being treated is moved between two electrodes connected to a source of high frequency electric current, the dielectric losses in the material being treated causing the desired heating of the same. If desired one of the electrodes mentioned may be the material which supplies the static pressure.

A still further object of the invention is the provision of a process such as above outlined for the heat curing of materials wherein the material is cured while in motion, and wherein after passing beyond the influence of the electrostatic field the cured material is subjected to a cooling operation. Cooling may be effected by lowering the temperature of the pressure applying medium, or by moving the material through a coolant before it discharges from the apparatus.

A still further and more specific object of my invention is to pass the material through an electrostatic field while the material is submerged in a static-pressure applying medium which is disposed in a U-tube arrangement, whereby the pressure applying medium may be a liquid or semi-liquid and yet stuffing boxes or valves are unnecessary.

Other objects of the invention will be brought out hereinafter.

In the accompanying drawings I have illustrated in sectional elevation two embodiments of the invention:

Fig. 1 shows one embodiment of the invention in sectional elevation;

Fig. 2 is an elevational view of another embodiment; and

Fig. 3 is a section on the line 2—2 of Fig. 2.

For purposes of clarity I have chosen to illustrate the invention as applied to the vulcanizing of the insulation of metal conductors insulated with rubber and rubber-like materials. It is to be distinctly understood, however, that this showing is merely illustrative and not to be construed as limiting the invention to this art. My invention, as above pointed out, is applicable broadly to any heat curable or heat settable material that is a poor electrical conductor.

Referring to Fig. 1: 2 designates a continuous metal conductor which is fed continuously through spewing apparatus 4 where the heat curable insulation 6 is applied. This may be a vulcanizable rubber or other compound. Inasmuch as this equipment is old and well known I have made no attempt to illustrate it in detail. The conductor after receiving its insulation is passed over idler roller 8 and from thence downwardly through a vertically extending tube 10. This tube, as illustrated, is of metal but under certain conditions, to be hereinafter referred to, this tube need not be electrically conducting. From the bottom of the tube 10 the insulated conductor passes into and through a chamber 12 about the lower side of an idler roller 14 and out of the chamber upwardly through a vertical tube 16, which too may be of metal or other suitable material. In the illustration the tube 10 is to be employed as an electrode.

The tubes 10 and 16 together with the compartment or chamber 12 provide, in effect, a U-tube containing a static-pressure applying mass 20. This mass, as above noted, may be liquid, semi-liquid or comminuted. Examples of usable materials are water, brine, mercury, mixtures of water or other liquid with comminuted solids, lead oxide, soapstone, etc. By the use of a U-shaped arrangement such as illustrated I am not only able to avail myself of static pressure but I may employ a liquid as the pressure medium without using valves or stuffing boxes. This is of material advantage in that it reduces the equipment necessary for the practice of my invention to a very simple form and injury to the material being treated is avoided.

It will be understood, of course, that the heavier the pressure medium employed the shorter the U-tube legs necessary to give the desired static pressure.

Curing of the insulation 6 is effected as it passes through the apparatus by subjecting the insulation to the action of an electrostatic field generated, for example, by connecting the conductor 2 and one of the metal legs of the U-tube to a source of high frequency current, as indicated at 22 and 24. The current employed is of very high frequency, of the order of several million cycles.

It will be understood that when the insulation 6, which is a poor conductor, passes through the electrostatic field, the dielectric losses in the insulation will cause the temperature of the same to rise to whatever vulcanizing temperature may be desired. It is evident that the extent, that is, length of the field is determined by the location of the insulation 18 which interrupts the continuity of the conducting path provided by the tubes 10 and 16 and the walls of the chamber 12.

The heating of the material 6 will be uniform, as distinguished from those processes where, for example, an insulated conductor is passed through a steamchest, and wherein necessarily the heat of the steam must be conducted through the material radially, which is not conducive to a uniform cure, and limits the thickness of the insulating wall which can be properly cured. These disadvantages of course are avoided in my process.

It will be appreciated that by passing the material through a U-tube or similar arrangement, as I have illustrated, the material is subjected to a static pressure during the vulcanizing operation which prevents swelling of the insulation and the production of a spongy mass.

As above mentioned, the pressure medium 20 may be conducting, a salt brine or mercury, for instance. In that event the tubes 10 and 16 need not be electrically conducting and the pressure medium may be employed as one electrode instead.

It may be desirable under some conditions artificially to cool the material being treated after the curing operation. This may be done in several ways. For example, cooling coils may be provided in the compartment 12. On the other hand, I may use the equipment illustrated. A body of coolant 26, water for example, may be maintained on the surface of the material 20 and circulated by pump 28 through cooling coils 30.

In the embodiment of the invention as illustrated in Figs. 2 and 3, I have shown the curing of the rubber insulation of a conductor, the insulation being applied, sheathed in metal, vulcanized and the metal sheath removed in a continuous operation.

Referring to this embodiment of my invention, the metal conductor is continuously taken from a supply reel 32. As the conductor is advanced rubber insulation 6 is applied thereto and enclosed in a thin metal sheath 34. This is commercial practice, and for this reason no details of the apparatus for applying the insulation and sheath have been illustrated.

24 designates a conductor leading from a source of high frequency current of very high frequency of the order of several million. An electrode 25 is connected to this conductor and has sliding contact with the advancing bare conductor 2. The conductor for the other side of the circuit is designated 22 and it is connected with an electrode 23 having sliding contact with the advancing metal sheath 34. The contacts 23 and 25 are so spaced that they are located at the nodal points of the wave employed. In this way I obtain the maximum in uniform heating of the insulation 6.

It will be appreciated that the heating effect is obtained in the same way as in the embodiment illustrated in Fig. 1, the dielectric losses in the insulation 6 as the same passes through the electrostatic field causing the temperature of the insulation to rise uniformly to whatever vulcanizing temperature may be desired.

As above pointed out my invention has been described in connection with the curing of the insulation of an insulated conductor for purposes of illustration and clarity of description only. My invention is applicable to the curing of any heat curable or settable material which is a poor electrical conductor. For brevity and clarity these materials in the claims will be referred to as heat curable materials, which expression is to be interpreted to embrace vulcanizable materials as well as materials which are not vulcanizable but set under the application of heat, such as plastics.

It is to be understood that the equipment or apparatus hereinabove described is purely illustrative and that changes may be made therein without departing from the spirit and scope of my invention.

What I claim is:

1. The process of thermally curing materials which are poor electrical conductors, which process comprises continuously advancing the material through a conducting liquid which is under hydrostatic pressure while passing the material between two electrodes connected to a source of high frequency alternating current, the conducting liquid constituting one electrode.

2. Apparatus for the heat curing of materials, comprising in combination a U-tube open at both ends for the passage therethrough of the material to be treated, a liquid or semi-liquid material partially filling the U-tube, guide means in the bottom of the tube for maintaining the material being treated submerged, whereby the material is subjected to hydrostatic pressure as it is advanced through the tube, and means for creating an electric field of high frequency through which the material passes as it moves through the said tube.

3. Apparatus for the heat curing of the insulation of electric conductors, said apparatus comprising in combination a U-tube open at its ends for the passage of the insulated conductor therethrough, said U-tube being electrically conducting, a liquid partially filling the tube and through which the insulated conductor must pass as it traverses the tube whereby hydrostatic pressure is applied to the insulation, and a source of high frequency electricity connected to said tube and the said conductor, whereby the insulation is subjected to the heating action of a high frequency electrostatic field as it passes through the tube.

4. The process of thermally curing materials of high electric resistance, which process comprises advancing the material simultaneously through an electrostatic field and a fluid medium which is under hydrostatic pressure to cure the insulation while preventing its distortion, and continuously cooling the cured material as it continuously passes out of the pressure medium.

5. The process of curing in situ the insulation of an electric conductor, said process comprising advancing the insulated conductor through a conducting liquid which is under hydrostatic pressure and simultaneously subjecting the insulation to the curing action of an electrostatic field by connecting the conductor and the conducting liquid to a source of high frequency alternating current.

CHARLES E. BENNETT.